(12) United States Patent
Yuan et al.

(10) Patent No.: US 12,722,312 B2
(45) Date of Patent: Sep. 1, 2026

(54) SPHERICAL DEXTEROUS HAND FOR OBJECT GRASPING AND WITHIN-HAND MANIPULATION

(71) Applicant: The Board of Trustees of the Leland Stanford Junior University, Stanford, CA (US)

(72) Inventors: Shenli Yuan, Mountain View, CA (US); J. Kenneth Salisbury, Jr., Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 983 days.

(21) Appl. No.: 17/801,883

(22) PCT Filed: Mar. 9, 2021

(86) PCT No.: PCT/US2021/021434

§ 371 (c)(1),
(2) Date: Aug. 24, 2022

(87) PCT Pub. No.: WO2021/183466

PCT Pub. Date: Sep. 16, 2021

(65) Prior Publication Data

US 2023/0029226 A1 Jan. 26, 2023

Related U.S. Application Data

(60) Provisional application No. 62/986,894, filed on Mar. 9, 2020.

(51) Int. Cl.
*B25J 15/00* (2006.01)
*B25J 15/10* (2006.01)

(52) U.S. Cl.
CPC .......... *B25J 15/10* (2013.01); *B25J 15/0033* (2013.01)

(58) Field of Classification Search
CPC ...... B25J 15/10; B25J 15/0033; B25J 15/103; B23B 1/1269
USPC ........................................................ 294/106
See application file for complete search history.

(56) References Cited

U.S. PATENT DOCUMENTS 3,144,947 A * 8/1964 Pittwood ................. B25J 15/10 414/730
4,653,793 A 3/1987 Guinot
4,921,293 A 5/1990 Ruoff
5,052,736 A * 10/1991 Loncaric ............. B25J 17/0216 901/45
5,108,140 A 4/1992 Bartholet
5,927,423 A * 7/1999 Wada ................. B60B 35/1072 180/209
7,296,835 B2 11/2007 Blackwell
(Continued)

*Primary Examiner* — Paul T Chin

(57) ABSTRACT

Structural designs and operational methods for object grasping and within-hand manipulation of an object is provided using rolling structures. The use of rolling structures reduces the need of finger gaiting, which is the periodic relocation of fingers on the object while maintaining a grasp, during manipulation. Embodiments of the invention provide a more efficient method of in-hand manipulation and grasping. In one example, two degrees of freedom rollers allow the object being manipulated in any direction in 3D space while remaining contact with the object.

10 Claims, 3 Drawing Sheets

(56) References Cited

U.S. PATENT DOCUMENTS

| | | | | |
|---|---|---|---|---|
| 7,445,260 | B2 * | 11/2008 | Nihei | B25J 15/08 901/34 |
| 7,707,914 | B2 * | 5/2010 | Pietras | E21B 19/164 81/57.2 |
| 8,182,010 | B2 | 5/2012 | Lee | |
| 8,733,810 | B2 * | 5/2014 | Oda | B25J 15/0004 414/730 |
| 10,464,218 | B2 * | 11/2019 | Golan | B25J 15/103 |
| 12,257,699 | B2 * | 3/2025 | Kalouche | B25J 15/0206 |
| 2015/0123416 | A1 * | 5/2015 | Kitamura | B25J 15/08 901/34 |
| 2015/0272749 | A1 * | 10/2015 | Amend, Jr. | A61F 2/588 623/64 |
| 2015/0303785 | A1 | 10/2015 | Neff | |
| 2017/0341690 | A1 * | 11/2017 | Pikulski | B62K 23/08 |
| 2021/0310465 | A1 * | 10/2021 | Rabaut | B66C 1/108 |
| 2023/0211512 | A1 * | 7/2023 | Koyama | B25J 15/0009 294/213 |

* cited by examiner

SPHERICAL DEXTEROUS HAND FOR OBJECT GRASPING AND WITHIN-HAND MANIPULATION

FIELD OF THE INVENTION

This invention relates to devices and methods for robotic hand and finger manipulation.

BACKGROUND OF THE INVENTION

In an effort to bring robots from the laboratory into real world environments, researchers have endeavored to develop increasingly dexterous robots that can interact deftly with objects. For such robots to take on a wide range of everyday tasks, they need to be capable of sophisticated object manipulation. Many vital higher-level tasks will rely on a robot's capability to perform in-hand manipulation by re-orienting objects while maintaining the grasp. Out of all the grasping and manipulation tasks, in-hand manipulation is among the ones that require the most dexterity.

Common approaches to designing robotic grippers that can perform in-hand manipulation are: anthropomorphic hands which take advantage of intrinsic human dexterity, but due to the high number of degrees of freedom are complex and expensive; under-actuated hands which passively conform to objects, achieving good grasp stability, but at the cost of the controllability needed to perform many in-hand manipulation tasks; grippers with active surfaces (such as conveyors) which allow for the object to be manipulated without changing grasp pose, but with a fixed conveyor orientation limiting possible motions.

The present invention advances the robotic field with a new structural design and operational methods for object grasping and within-hand manipulation of an object.

SUMMARY OF THE INVENTION

In the pursuit of developing ever more capable robotic graspers, researchers have sought to match or exceed the remarkable dexterity of the human hand through mechanical means. Dexterity requirements for an array of grasping tasks are that the most dexterity are both prehensile and within-hand. These tasks are manipulations in which contact forces from the hand alone are used to grasp and stabilize the object, and where motion of the object is generated from the modulation of the contact forces between the hand elements and the grasped object. A robotic hand with the ability to perform within-hand manipulation possesses the ability to transition from the initial grasp configuration to other grasp configurations, for example, to establish a more secure grasp by engaging object surfaces unavailable in the initial grasp orientation. The present invention advances the robotic field with a new structural design and operational methods for object grasping and within-hand manipulation of an object.

In one embodiment, a robotic hand is provided. The robotic hand has a plurality of fingers each with a distal end and a proximal end. In one example, the number of fingers is two or more fingers. In another example, the number of fingers is three or more. At the distal end, each finger has a rolling structure with two-coupled substantially orthogonal manipulating degrees of freedom each actuated independently with an actuator. The plurality of fingers are spaced and orientated with respect to each other such that the rolling structures are capable of manipulating an object.

One of the two-coupled substantially orthogonal manipulating degrees of freedom could be defined as enabling a steering motion of the rolling structure and the other of the two-coupled substantially orthogonal manipulating degrees of freedom could be defined as enabling a rolling motion of the rolling structure. Therewith together capable of rolling and steering the object when held in between the rolling structures of the plurality of fingers.

At the proximal end, each finger has a grasping degree of freedom. The grasping degrees of freedom for the plurality of fingers is then capable of grasping the object, and actuated therewith capable of grasping objects in various sizes and shapes. In one example, the grasping degree of freedom could be defined as substantially orthogonal to one of the two-coupled substantially orthogonal manipulating degrees of freedom.

Each rolling structure could be a spherical rolling structure or a cylindrical rolling structure, or in another example could be a combination of at least one spherical rolling structure and at least one cylindrical rolling structure. As a skilled artisan would appreciate, any type of roller structure is feasible, and the spherical and cylindrical are just two examples, as long as the objective(s) of this invention are met.

In a variation of the robotic hand, at least one or each one of the plurality of fingers is an articulated multi-segmented finger. Though, as a skilled artisan would readily appreciate, is that more degrees of freedom are then introduced making the control problem more complicated. For example, one or more degrees of freedom for bending finger segment 190 between axis 110 and 130—this would allow for traditional curling motion and/or allow for side to side motion of the finger, which would allow grasp gaiting.

In another variation of the robotic hand, the rolling structure could have tactile sensors either on a surface of each rolling structure, embedded in each rolling structure, or a combination thereof. These sensors could then provide feedback to a user in for example a haptic or virtual operation environment, as well as feedback to the control or learning algorithms.

In another embodiment, a method of grasping and manipulating an object is provided where the robotic hand is structurally defined as described above. In the method, one would have a robotic hand with a plurality of fingers each with a distal end and a proximal end. At the distal end, each finger has a rolling structure with two-coupled substantially orthogonal manipulating degrees of freedom each actuated independently with an actuator. The plurality of fingers are spaced and orientated with respect to each other such that the rolling structures together are capable of manipulating the object.

At the proximal end, each finger has a grasping degree of freedom. The grasping degrees of freedom for the plurality of fingers are then capable of grasping the object, and actuated therewith capable of grasping objects in various sizes and shapes. Similarly, as for the device, one or more degrees of freedom for bending finger segment 190 between axis 110 and 130—this would allow for traditional curling motion and/or allow for side to side motion of the finger, which would allow grasp gaiting.

In the method, steering and moving the object is achieved by controlling one of the two-coupled substantially orthogonal manipulating degrees of freedom. Rolling and moving the object is achieved by controlling the other of the two-coupled substantially orthogonal manipulating degrees of freedom. Grasping the object is achieved by controlling the grasping degree of freedom.

Manipulation via rolling (or active surfaces) according to the embodiments of the present invention reduces the need of finger gaiting, which is the periodic relocation of fingers on the object while maintaining a grasp, during manipulation. Embodiments of the present invention provide a more efficient method of in-hand manipulation and grasping. The two degrees of freedom rollers allow the object being manipulated in any direction in 3D space while remaining contact with the object.

DETAILED DESCRIPTION

Figure 1:
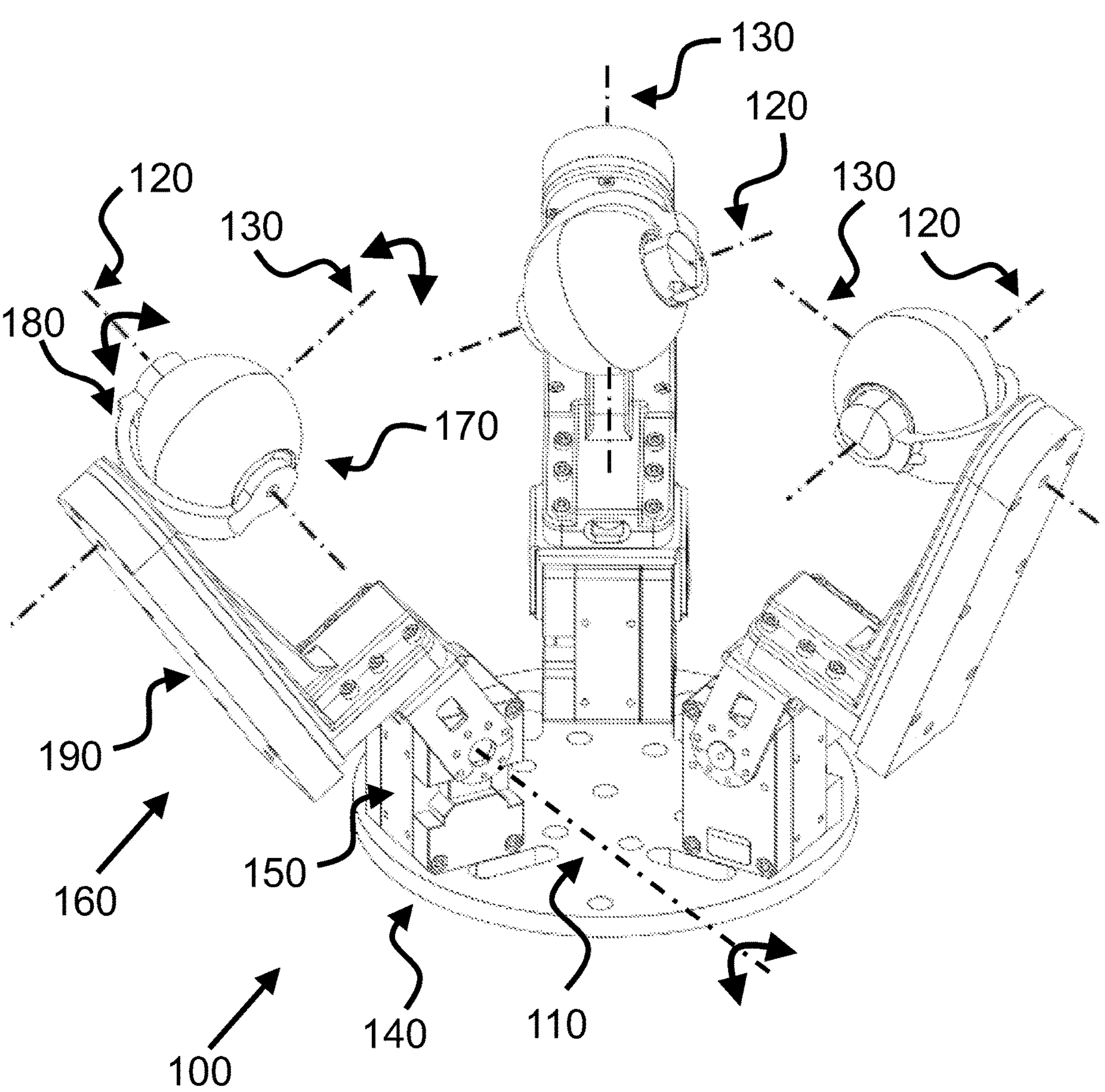
FIG. 1 shows according to an exemplary embodiment of the invention of a grasper 100 with three so-called fingers or segments 160 each having three degrees of freedom: 110, 120 and 130.

The present invention provides a grasper design or in-hand manipulation device 100 using articulated, actively driven spherical finger rollers 170 located at the finger tips (FIG. 1). By incorporating continuous rotating mechanisms, it is possible to create graspers that are highly capable, but relatively simple by design. The active surface achieved by rolling and re-orientation of the spherical rollers allow the grasper to perform in-hand manipulation without the need for finger gaiting. The ability to re-orient an object to any direction also lessens the need to use externally actuated degrees of freedom (e.g. actuation of the robotic arm and wrist) which simplifies the control scheme. More importantly, the spherical design of the finger tips allows for stable grasps independent from each of the roller orientations, eliminating the need to analyze grasping modes for different combinations of roller orientations.

In one embodiment, in-hand manipulation device 100 is based on a 3-fingered grasper, each indicated by 160, with spherical finger rollers 170 at the fingertips as shown in FIG. 1. In-hand manipulation device 100 can be expanded with for example object tracking techniques and a control policy to create a more comprehensive system (not shown). Current robotic graspers either lack the mobility to execute complex in-hand manipulation tasks, such as parallel jaw graspers, are underactuated and difficult control, or are incredibly complex and difficult to control. Embodiments of the present invention were aimed to perform complex in-hand object transformations with a robust control policy.

In-hand exemplary manipulation device 100 has three degrees of freedom for each finger (FIG. 1). A first degree of freedom (axis) 110 is between finger base 150 and finger 160. Movement about axis 110 enables grasping of an object.

Each finger base 150 is supported by support base 140 which groups and orients the three fingers as a grasping device. First degree of freedom 110 together with the each facing orientation of each finger base 150 and finger 160 allows each finger 160 to rotate towards and away from each other. As such spherical rollers 170 at the fingertips are able to grasp or release an object by rotating around first degree of freedom 110. An example of a joint for the first degree of freedom 110 is a revolute joint, but other joints could be realized as well, all directly driven by an actuator (not shown).

The second 120 and third 130 degree of freedom (axis) are located at each fingertip of each finger 160, and axis 120 is enabling rolling of an object, whereas axis 130 is enabling steering of an object. The terminology of rolling and steering is similar as a bicycle wheel where rolling direction is dependent on the steering direction. Hence the terminology used in the invention of two-coupled substantially orthogonal manipulating degrees of freedoms (one for rolling and one for steering).

The joint responsible for rotating around third degree of freedom 130 is orthogonal to the first degree of freedom 110, and could be driven by an actuator e.g. a micro DC motor with a built-in gearbox and quadrature encoder. For a compact form-factor, this actuator could be located remotely from the axis of rotation 130 through a timing belt (not shown), and allows the roller assembly to be pitched. In the example of FIG. 1, yoke 180 connects spherical finger roller 170 to finger segment 190 of finger 160.

The joint responsible for rotating around second degree of freedom 120 could be actuated using the same type of geared motor as for the third degree of freedom 130, but housed inside the roller assembly 170 (FIG. 2), allowing it to perform continuous rotation of the spherical contact surface without any cables winding.

Figure 2:
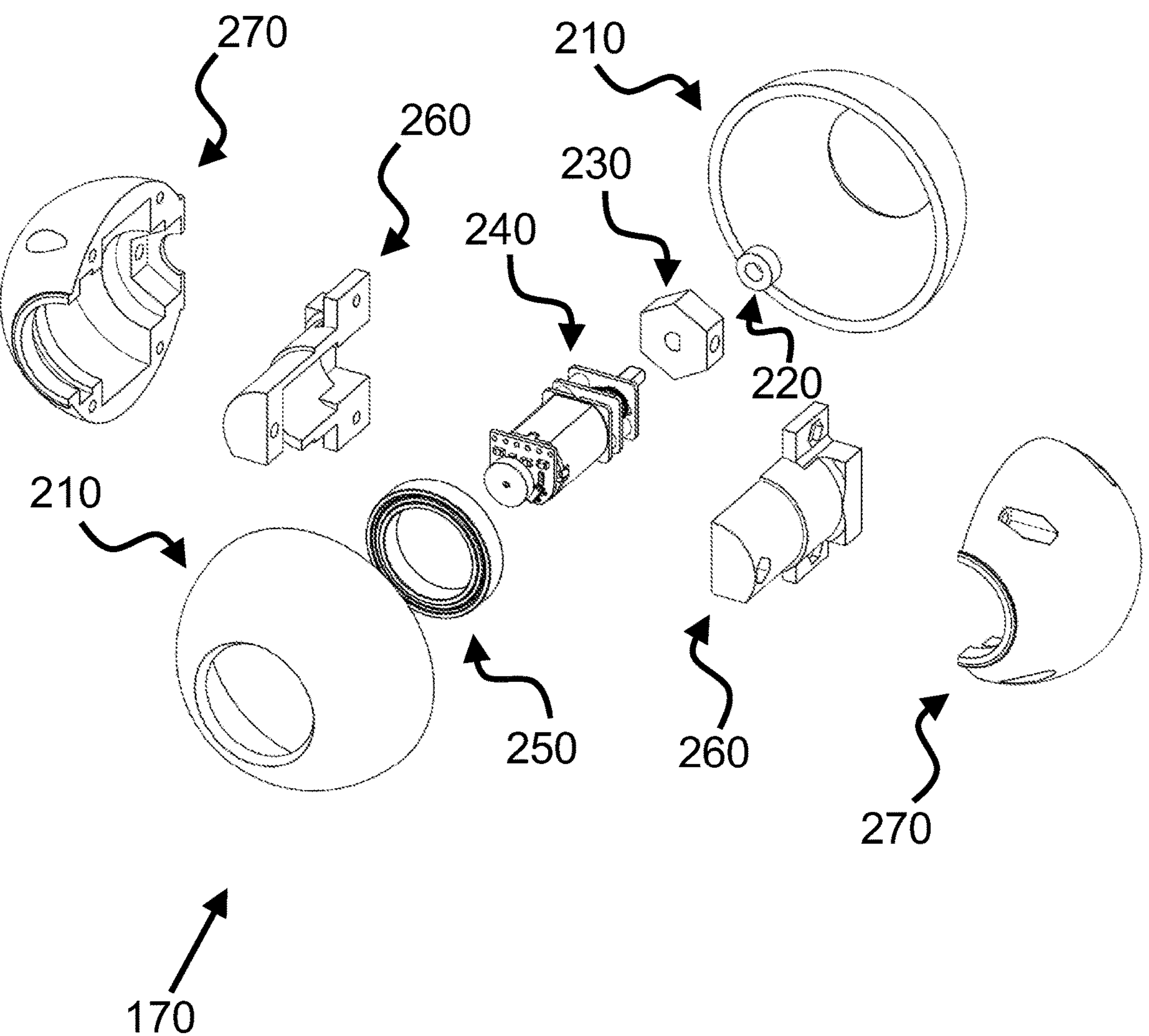
FIG. 2 shows according to an exemplary embodiment of the invention an exploded view of a finger roller 170 for each finger or segment 160.

The spherical roller can be encased in a pair of 2 mm thick semi-spherical silicone covers 210 (e.g. SmoothOn Mold-Star 16) to provide a high-friction surface for grasping and manipulation. In the example of FIG. 2, spherical finger roller 170 encases a motor shaft bearing 220, a shaft-sphere coupler 230, a micro DC motor 240, a ball bearing 250, a motor holder mechanism 260, and a roller housing 270 which snaps the assembly together. As an example, an entire grasper could weigh approximately 700 grams, and each finger is capable of outputting a maximum 33.6 N of force at its fingertip.

Alternatively, to the spherical rollers a cylindrical roller could be used as well. However, though possible, it is noted that a cylindrical roller is limited due to grasp stability. Due to the cylindrical design of the finger tips, several grasping configurations are unstable, resulting in undetermined manipulation behaviors. The redundant combinations of grasping configurations also complicate the control scheme as the configuration used is dependent on specific manipulation tasks and object being manipulated.

Figure 3:
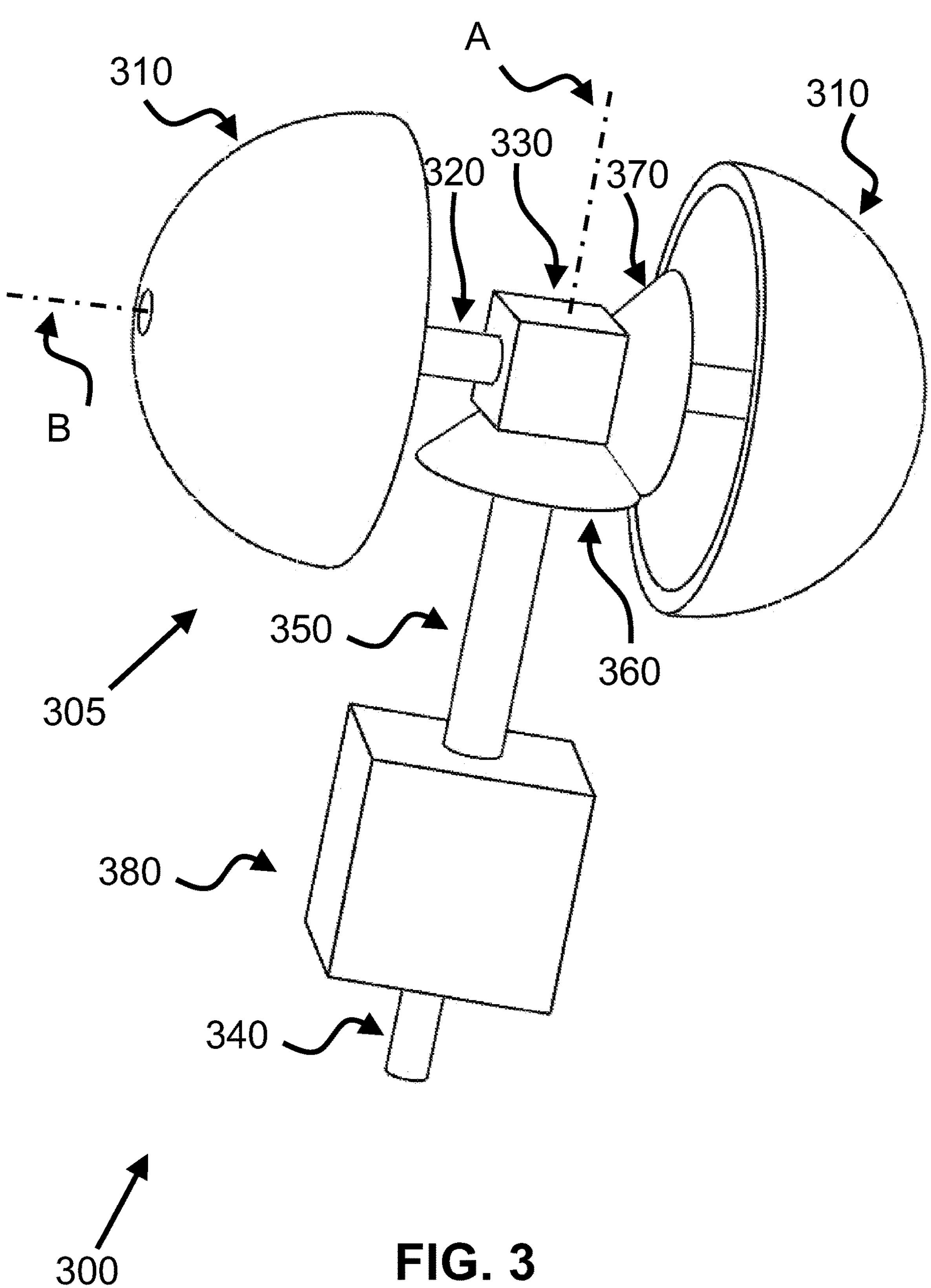
FIG. 3 shows according to an exemplary embodiment of the invention an alternate finger and roller assembly that contacts an object that is being manipulated.

FIG. 3 shows an exemplary embodiment of another design of a finger 300 with a finger roller as a rotation ball mechanism which is shown in an exploded view 305. The rotation ball mechanism 305 has two hemispheres 310, which are rigidly attached to a first shaft 320 to which a first bevel gear 370 is rigidly attached. First shaft 320 passes rotatably through a hole in end-piece 330 which is rigidly attached to second shaft 340. A third hollow shaft 350 has a second bevel gear 360 rigidly attached to third hollow shaft 350. This third shaft 350 is placed rotatably and concentrically about first shaft 320 and located to as to mesh the two bevel gears 360 and 370. Rotation of second shaft 340 causes the entire mechanism to rotate continuously about a first axis A. Rotation of the third shaft 350 causes the two hemispheres 110 to rotate continuously about a second axis B. Box or structure 380 is rigidly connected/attached to shaft 340 to avoid third shaft 350 from falling down, i.e. box 380 presses on or holds shaft 350 in place. Differently said, box 380 is used to locate shaft 350 so as to keep gears 360 and 370 meshed.

What is claimed is:

1. A robotic hand, comprising:

a plurality of fingers each with a distal end and a proximal end, wherein at the distal end, of each of the plurality of fingers a rolling structure is connected, wherein the rolling structure is capable of rotating about a first axis with respect to the distal end of the respective finger, wherein the rolling structure is further capable of rotating about a second axis with respect to the distal end of the respective finger, wherein the first axis and the second axis are coupled axes and substantially orthogonal to each other, wherein the first axis and the second axis are each actuated independently from each other with an actuator, and wherein the plurality of fingers are spaced and orientated with respect to each other such that the rolling structures are capable of manipulating an object.

2. The robotic hand as set forth in claim 1, wherein at the proximal end each finger of the plurality of fingers is capable of rotating around a third axis, wherein rotation around the third axis creates a grasping degree of freedom for each of the fingers, wherein the rotation around the third axis is actuated independently for each of the plurality of fingers, and wherein the rotation around the third axis enables the plurality of fingers to grasp objects of various sizes and shapes.

3. The robotic hand as set forth in claim 2, wherein the third axis is substantially orthogonal to either the first axis or the second axis.

4. The robotic hand as set forth in claim 1, wherein the rotation around the first axis enables what is referred to as a steering motion and the rotation around the second axis enables what is referred to as a rolling motion, therewith together capable of rolling and steering the object when held in between the rolling structures of the plurality of fingers.

5. The robotic hand as set forth in claim 1, wherein each rolling structure is a spherical rolling structure or a cylindrical rolling structure.

6. The robotic hand as set forth in claim 1, wherein the rolling structure spherical, or cylindrical.

7. The robotic hand as set forth in claim 1, wherein the plurality of fingers is two or more fingers.

8. The robotic hand as set forth in claim 1, wherein at least one of the plurality of fingers is an articulated multi-segmented finger.

9. The robotic hand as set forth in claim 1, wherein the rolling structure comprises tactile sensors either on a surface of each rolling structure, embedded in each rolling structure, or a combination thereof.

10. A method of grasping and manipulating an object, comprising:

(a) having a robotic hand with a plurality of fingers each with a distal end and a proximal end, wherein at the distal end of each of the plurality of fingers a rolling structure is connected, wherein the rolling structure is capable of rotating about a first axis with respect to the distal end of the respective finger, wherein the rolling structure is further capable of rotating about a second axis with respect to the distal end of the respective finger, wherein the first axis and the second axis are coupled axes and substantially orthogonal from each other, wherein the first axis and the second axis are each actuated independently from each other with an actuator;

(b) manipulating the object by independently controlling the one or more of the first axis, second axis and the third axis associated with the one or more of the plurality of fingers.

* * * * *